United States Patent [19]

Tempel

[11] Patent Number: 4,820,311
[45] Date of Patent: Apr. 11, 1989

[54] SOLID FORMULATION OF ANIONIC DYES CONTAINING AN ETHOXYLATED STEARYL DIPHENYLOXYETHYL DIETHYLENE-TRIAMINE

[75] Inventor: Ernst Tempel, Riehen, Switzerland

[73] Assignee: Ciba-Geigy Corporation, Ardsley, N.Y.

[21] Appl. No.: 198,267

[22] Filed: May 25, 1988

[30] Foreign Application Priority Data

Jun. 3, 1987 [CH] Switzerland ............... 2096/87

[51] Int. Cl.$^4$ ................................ C09B 67/02
[52] U.S. Cl. .................................. 8/524; 8/551; 8/580; 8/602; 8/917; 8/924
[58] Field of Search .................... 8/524, 551, 602

[56] References Cited

U.S. PATENT DOCUMENTS 3,206,511 9/1965 Bindler et al. ............... 564/363

Primary Examiner—A. Lionel Clingman
Attorney, Agent, or Firm—Edward McC. Roberts

[57] ABSTRACT

A solid formulation comprising at least one water-soluble anionic dye, additional optional assistants and a combination of an ethoxylated stearyl diphenyloxyethyl diethylenetriamine and at least one anionic dispersant. Such formulations are distinguished in particular by very good hot water solubility.

10 Claims, No Drawings

SOLID FORMULATION OF ANIONIC DYES CONTAINING AN ETHOXYLATED STEARYL DIPHENYLOXYETHYL DIETHYLENE-TRIAMINE

The present invention relates to a solid formulation of anionic dyes, to a process for the preparation of said formulation, and to the use thereof for the preparation of dyebaths, pad liquors and printing pastes for dyeing and printing textile material, especially wool and polyamide materials.

It has been found that, surprisingly, the hot water solubility of solid formulations of water-soluble anionic dyes can be greatly enhanced by the presence of specific dispersants in conjunction with an ethoxylated stearyl diphenyloxyethyl diethylenetriamine.

Accordingly, the invention relates to a solid formulation comprising at least one water-soluble anionic dye and additional optional assistants, which formulation contains an ethoxylated stearyl diphenyloxyethyl diethylenetriamine in conjunction with at least one anionic dispersant.

The enhancement of the hot water solubility of the formulation can be determined by various tests. These tests are, for example:

(a) A small-scale test which comprises pouring 100 ml of water of 80°-85° C. on to 10 g of the formulation and stirring for 2 minutes with a glass rod to ensure that the formulation, on dissolving in water, does not form lumps and does not stick to the glass rod;

(b) a mechanical test to determine the cold water dispersibility and solubility (MKDL test), wherein the criterion for the actual water solubility is regarded as met if 5 g of the formulation are able to dissolve, under the action of controlled mechanical stirring, in 50 ml of water of 60° over 5 minutes;

(c) determining the actual solubility by leaving the solid formulation, for example, for 5 minutes at 60° C. in water and by subsequent filtration;

(d) determining the solubility by dissolving the solid formulation at 90° C. and then filtering the solution, or by dissolving the formulation at 90° C., then cooling the solution to 60° C. or 30° C. and filtering it.

The anionic dyes present in the solid formulations can belong to the most diverse classes of dyes and may contain one or more sulfonic acid groups and one or more fibre-reactive groups. They are in particular triphenylmethane dyes containing at least two sulfonic acid groups, monoazo and disazo dyes which are free from heavy metal atoms and which contain one or more sulfonic acid groups and in some cases one or more fibre-reactive groups, and monoazo, disazo, azomethine and formazan dyes which contain a heavy metal atom, in particular a copper, chromium, nickel or cobalt atom, especially metallised dyes which contain two molecules of azo dye or one molecule of azo dye and one molecule of azomethine dye bonded to a metal atom, and preferably those which contain monoazo and/or disazo dyes and/or azomethine dyes as ligands and a chromium or cobalt ion as central metal atom, as well as anthraquinone dyes, in particular 1-amino-4-arylaminoanthraquinone-2-sulfonic acids or 1,4-diarylamino- or 1-cycloalkylamino-4-arylaminoanthraquinonesulfonic acids. By fibre-reactive groups are meant groups which are able to form a covalent bond with the polyamide material or wool to be dyed.

Suitable anionic water-soluble dyes are in particular the wool dyes disclosed in European patent application EP-A-0089004. The amount of anionic wool dyes in the solid formulation varies from 20 to 80% by weight, based on the total formulation.

The anionic dyes present in the formulation are preferably in the uncut dry and ground state. Throughout this specification, the term "uncut" means that the dyes are obtained direct from the synthesis and contain no extender.

The ethoxylated stearyl diphenyloxyethyl diethylenetriamines are preferably compounds of formula

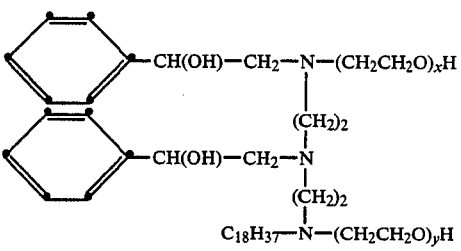

wherein the sum of x and y is preferably in the range from 80 to 130, most preferably from 90 to 110. They are compounds some of which are already known as levelling agents for acid wool dyeing. The amount in which they are present in the total formulation varies from 5 to 15% by weight, preferably from 5 to 10% by weight. The substances hitherto employed instead of these ethoxylated stearyl diphenyloxyethyl diethylenetriamines, for example inorganic salts, dextrin or anionic dispersants, have seen unable to prevent substantial lump formation.

Suitable anionic dispersants which are used in the practice of this invention in the solid formulations, individually or in admixture with other anionic dispersants, are the customary dispersants for water-soluble dyes, for example the condensates of aromatic sulfonic acids and formaldehyde, such as the alkali metal salt, in particular the sodium salt of the condensate of naphthalenesulfonic acid and formaldehyde. Particularly suitable anionic dispersants are, however, alkali ligninsulfonates or alkali oxyligninsulfonates, for example the compounds obtainable as "sulfite cellulose lye". In general, the solid formulations of this invention contain 5 to 50% by weight, preferably 5 to 20% by weight, of anionic dispersant.

A preferred formulation contains, based on the dye formulations, 5 to 10% by weight of an ethoxylated stearyl diphenyloxyethyl diethylenetriamine and 5 to 20% by weight of a sodium ligninsulfonate.

In addition, the solid formulations can contain one or more assistants such as salts, preferably inorganic salts, wetting agents, dust inhibitors and, in particular, an organic acid, preferably citric acid, for adjusting the pH to 4.5 to 6.5.

The solid formulations are prepared by mixing at least one water-soluble anionic dye and the additional optional assistants with an ethoxylated stearyl diphenyloxyethyl diethylenetriamine and at least one anionic dispersant. The procedure is that the uncut dye is first ground dry before it is mixture with dispersant, the ethoxylated stearyl diphenyloxyethyl diethylenetriamine and the further assistants, especially the organic acid.

The solid formulations of this invention are distinguished by very good solubility in water and therefore have advantageous properties. They are used for the preparation of dyebaths, pad liquors and printing pastes which are suitable for dyeing and printing textile material of wool and polyamide.

The following Examples illustrate the invention, but imply no restriction to what is described therein. Parts are by weight.

EXAMPLE 1

A solid formulation comprising
720 parts of the dye of formula (A)

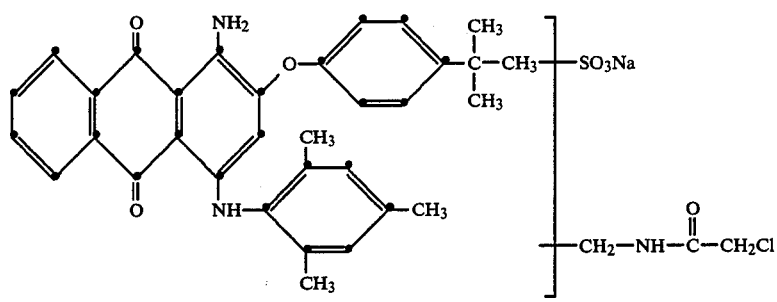

130 parts of sodium oxyligninsulfonate (B) as anionic dispersant and extender,
100 parts of an adduct of 1 mole of stearyl diphenyloxyethyl diethylenetriamine and 106 moles of ethylene oxide (C),
10 parts of citric acid (D),
20 parts of the sodium salt of 1-benzyl-2-heptadecylbenzimidazole-X,X-disulfonic acid (E) as wetting agent, and
20 parts of a dust inhibitor (F),
is prepared as follows:

The uncut dry anionic dye (A) is first ground in a mill, then in a mixer with compounds (B), (C), (D) and (E) for about 20 minutes. The dust inhibitor (F) is then sprayed on to the mixture, which is again thoroughly mixed for about 20 minutes to give a solid formulation whose water solubility, as Table 1 shows, is markedly enhanced compared with a formulation that does not contain component (C).

TABLE 1

| Formulation | Hot water solubility behaviour | MKDL Test at 60° C. |
|---|---|---|
| according to Example 1 with component (C) | some sticking to the glass rod | ca. 30 min |
| according to Example 1 without component (C) | viscous lumps | not soluble |

EXAMPLE 2

A solid formulation comprising
558 parts of the dye of formula (A$_1$)

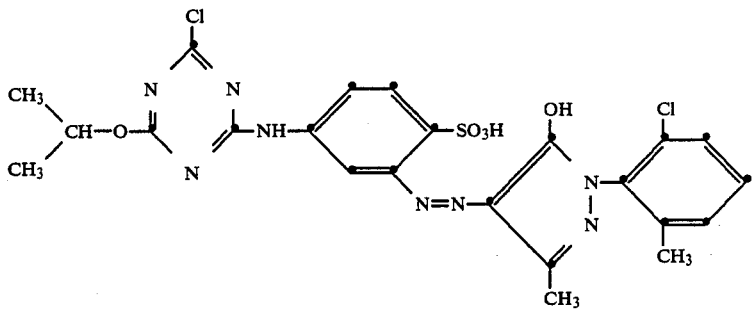

87 parts by weight of the dye of formula (A$_2$)

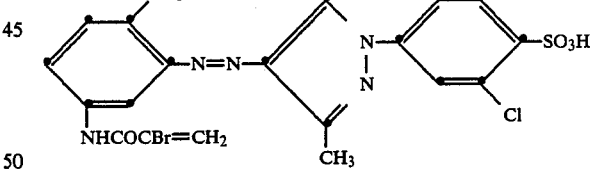

90 parts by weight of the sodium salt of the condensate of formaldehyde and naphthalenesulfonic acid (B) as anionic dispersant and extender,
45 parts by weight of ligninsulfonate (sulfite cellulose lye) (C) as anionic dispersant and extender,
100 parts by weight of the adduct of 1 mole of stearyl diphenyloxyethyl diethylenetriamine and 106 moles of ethylene oxide (D),
40 parts by weight of aminoacetic acid (E) as amphoteric surfactant for improving dispersibility,
30 parts by weight of sodium chloride (F),
20 parts by weight of the sodium salt of 1-benzyl-2-heptadecylbenzimidazole-X,X-disulfonic acid (G) as anionic surfactant for increasing the rate of wetting, and
30 parts by weight of a dust inhibitor (H),
and prepared as described in Example 1, has better solubility properties and enhanced hot water solubility compared with a formulation that does not contain component (D).

TABLE 2

| Formulation | Solubility (g/l) 90° C. | Solubility (g/l) 90/60° C. | Solubility (g/l) 90/30° C. | Hot water solubility behavior | MKDL Test at 60° C. | Actual solubility (g/l) 5 min./60° C. |
|---|---|---|---|---|---|---|
| according to Example 2 with component (D) | 100 | 100 | 100 | solution with finely dispersed components (1.5 min.) | 20 min. | 80 |
| according to Example 2 without component (D) | 80 | 50 | 50 | lump formation, sticking to glass rod (2 min.) | >20 min. | 50 |

EXAMPLE 3

A solid formulation comprising
733 parts of the dye of formula (A)

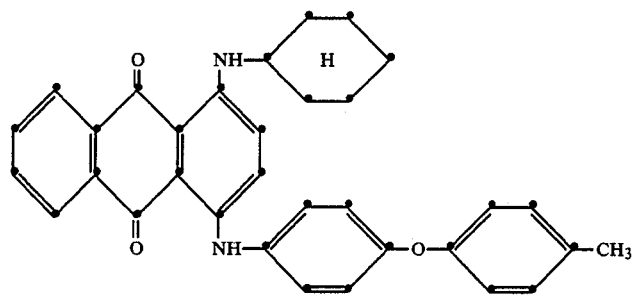

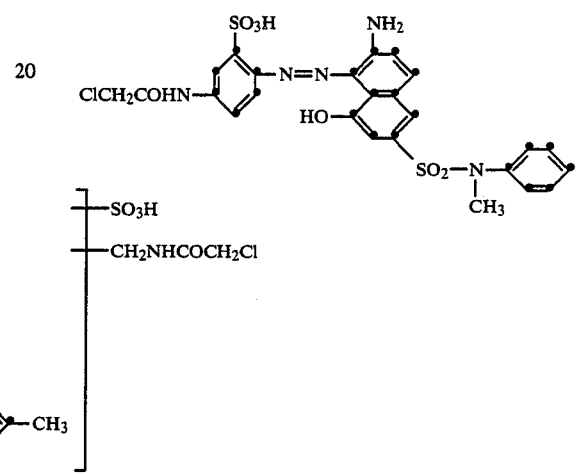

77 parts by weight of the sodium salt of the condensate of formaldehyde and naphthalenesulfonic acid (B) (anionic dispersant and extender), 50 parts by weight of the adduct of 1 mole of stearyl diphenyloxyethyl diethylenetriamine and 106 moles of ethylene oxide (C), 80 parts by weight of the sodium salt of isopropylbenzene-4-sulfonic acid (D), and 20 parts by weight of a dust inhibitor (E), and prepared according to the particulars of Example 1, has markedly better solubility in water than a formulation that does not contain component (C).

TABLE 3

| Formulation | Hot water solubility behaviour | MKDL-Test at 60° C. |
|---|---|---|
| according to Example 3 with component (C) | some sticking to the glass rod | 15 min. |
| according to Example 3 without component (C) | viscous lumps | not soluble |

EXAMPLE 4

A solid formulation comprising
214 parts by weight of the dye of formula ($A_1$)

220 parts by weight of the dye of formula ($A_2$)

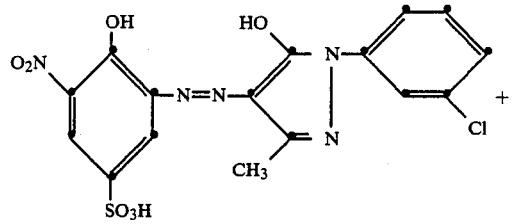

1:1 chromium complex

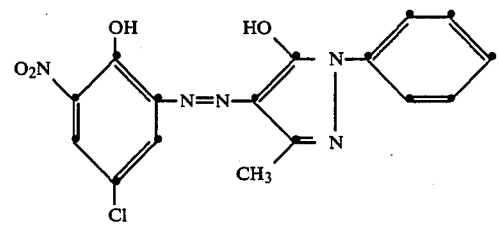

416 parts of the sodium salt of the condensate of formaldehyde and naphthalenesulfonic acid (B), 100 parts by weight of the adduct of 1 mole of stearyl diphenyloxyethyl diethylenetriamine and 106 moles of ethylene oxide (C), 30 parts by weight of the sodium salt of 1-benzyl-2-heptadecylbenzimidazole-X,X-disulfonic acid (D), and 20 parts by weight of a dust inhibitor (E), and prepared in accordance with the particulars of Example 1, has a substantially enhanced hot water solubility and, in addition, better water solubility, than a formulation that does not contain component (C).

TABLE 4

| Formulation | Hot water solubility | Actual solubility (g/l) 5 min./60° C. |
|---|---|---|
| according to Example 4 with component (C) | solution with finely dispersed components (2 min.) | 50 |
| according to Example 4 without component (C) | lump formation, sticking to glass rod (2 min.) | 30 |

What is claimed is:

1. A solid formulation comprising at least one water-soluble anionic dye and additional optional assistants, which formulation contains an ethoxylated stearyl diphenyloxyethyl diethylenetriamine in conjunction with at least one anionic dispersant.

2. A solid formulation according to claim 1, which contains an ethoxylated stearyl diphenyloxyethyl diethylenetriamine of formula

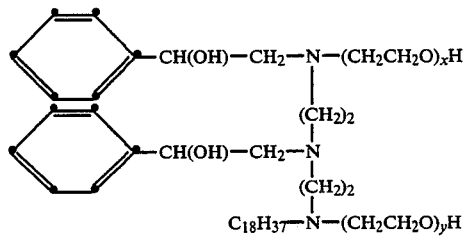

wherein the sum of x and y is in the range from 80 to 130.

3. A solid formulation according to claim 2, which contains, based on the dye formulation, 5 to 15% by weight of an ethoxylated stearyl diphenyloxyethyl diethylenetriamine and 5 to 50% by weight of an anionic dispersant.

4. A solid formulation according to claim 1, wherein the anionic dispersant is an alkali ligninsulfonate.

5. A solid formulation according to claim 1, wherein the anionic dispersant is an alkali oxyligninsulfonate.

6. A solid formulation according to claim 1, wherein the anionic dispersant is an alkali metal salt of the condensate of formaldehyde and naphthalenesulfonic acid.

7. A solid formulation according to claim 1 which contains, based on the dye formulation, 5 to 10% by weight of an ethoxylated stearyl diphenyloxyethyl diethylenetriamine as claimed in claim 2 and 5 to 20% by weight of a sodium ligninsulfonate.

8. A process for the preparation of a solid formulation as claimed in claim 1, which comprises mixing at least one water-soluble anionic dye and additional optional assistants with an ethoxylated stearyl diphenyloxyethyl diethylenetriamine and at least one anionic dispersant.

9. A process according to claim 8 which comprises adding, as additional assistant, an organic acid, a salt, a wetting agent or a dust inhibitor.

10. A method of preparing an aqueous dyebath, a pad liquor, or a printing paste, comprising the step of dispersing a solid formlation of claim 1 in water.

* * * * *